United States Patent [19]

Venable et al.

[11] Patent Number: 5,270,806
[45] Date of Patent: Dec. 14, 1993

[54] IMAGE EDITING SYSTEM AND METHOD HAVING IMPROVED MULTI-DIMENSIONAL EDITING CONTROLS

[75] Inventors: Dennis L. Venable, Rochester; James E. Bollman, Williamson, both of N.Y.

[73] Assignee: Xerox Corporation, Stamford, Conn.

[21] Appl. No.: 772,719

[22] Filed: Oct. 7, 1991

[51] Int. Cl.$^5$ .............................................. G09G 1/16
[52] U.S. Cl. .................................... 358/500; 345/113; 345/121; 345/147; 345/150
[58] Field of Search ................ 340/709, 703, 701; 358/75-80; 364/900

[56] References Cited

U.S. PATENT DOCUMENTS

| | | | |
|---|---|---|---|
| 4,190,834 | 2/1980 | Doornink | 340/709 |
| 4,200,867 | 4/1980 | Hill | 340/703 |
| 4,245,244 | 6/1981 | Lijewski et al. | 358/111 |
| 4,345,313 | 8/1982 | Knox | 364/515 |
| 4,354,184 | 10/1982 | Woborschil | 340/709 |
| 4,467,322 | 8/1984 | Bell et al. | 340/701 |
| 4,495,491 | 1/1985 | Postl | 340/709 |
| 4,661,810 | 4/1987 | Himelstein et al. | 340/709 |
| 4,694,286 | 9/1987 | Bergstedt | 340/703 |
| 4,733,295 | 3/1988 | Hemsky et al. | 358/22 |
| 4,751,503 | 6/1988 | Kermisch | 340/709 |
| 4,751,507 | 6/1988 | Hama et al. | 340/724 |
| 4,772,882 | 9/1988 | Mical | 340/709 |
| 4,896,291 | 1/1990 | Gest et al. | 364/900 |
| 4,989,079 | 1/1991 | Ito | 358/80 |

*Primary Examiner*—Stephen Brinich
*Attorney, Agent, or Firm*—Finnegan, Henderson, Farabow, Garrett & Dunner

[57] ABSTRACT

An image editor includes a pixel buffer for storing color data for an image to be edited. A monitor screen displays the image and an active area having a graphic that represents two color descriptor variables. A pair of overlays controls the respective color descriptor variables singly or together. In one embodiment, the active area is a circle with a color wheel about which hue varies angularly and along the radius of which chroma varies. A radial overlay line controls hue and a concentric radially movable ring controls chroma. In another embodiment among others, the active area is a square with a checkerboard graphic. Black and white squares within the checkerboard indicate increasing brightness in the vertically upward direction and increasing contrast in the rightward horizontal direction. Horizontal and vertical hairline overlays control the brightness and contrast, respectively.

13 Claims, 7 Drawing Sheets

IMAGE EDITING SYSTEM AND METHOD HAVING IMPROVED MULTI-DIMENSIONAL EDITING CONTROLS

CROSS REFERENCE TO RELATED APPLICATIONS

Reference is made to the following concurrently filed patent applications that are assigned to the present assignee and are hereby incorporated by reference:

Ser. No. 07/772,717, entitled IMAGE EDITING SYSTEM AND METHOD HAVING IMPROVED COLOR KEY EDITING by Dennis L. Venable, filed Oct. 7, 1992.

Ser. No. 07/772,718, entitled IMAGE EDITING SYSTEM AND METHOD HAVING IMPROVED AUTOMATIC OBJECT SELECTION by Michael R. Campanelli, Dennis L. Venable and Zhigang Fan, filed Oct. 7, 1991.

Reference is also made to the following patent application assigned to the present assignee:

Ser. No. 07/517,895 entitled COLOR EDITING WITH SIMPLE ENCODED IMAGES, and filed by James E. Bollman and Myra E. Van Inwegen on May 2, 1990.

BACKGROUND OF THE INVENTION

The present invention relates to image processing systems and methods and more particularly to editing controls having a multi-dimensional editing capability.

Various kinds of image processing systems employ editing controls in image editing operations. One such system is a duplicator system in which a stored electronic image can be edited and applied to a platen to produce a hard copy output. Another system is a reprographic system in which a digital image is scanned from a hard copy input and then processed through an image editor to generate an edited hard copy output from a laser printer or the like. In an image edit system, an image editor processes stored images in accordance with edit operations and stores the edited images electronically for use in other systems.

Editing controls are employed in image editors to make color modifications in a displayed image in accordance with a predefined edit operation. For example, in a TV Color operation, all of the colors in an image are simultaneously varied in accordance with the operation of an edit control, such as a blue or green control, or a hue control. Other edit operations include Line Art, Image Color, Hi-lite, Rotate, etc.

Generally, it is often desirable to make color modifications in an image in accordance with a selected edit operation by simultaneously changing the basic red, green and blue components to vary a visible attribute of the image until the desired appearance is obtained. As an example, the variable image attribute (or color descriptor variable) may be chroma which is a measure of color purity.

In conventional image editing systems, edit controls have been employed to enable an operator to modify an image through changes in a color descriptor variable such as hue or contrast. However, in the interest of achieving better image editing with increased editing productivity and facility, it is desirable that greater integration be provided in the editing control of the visible aspects of an image. Specifically, it is desirable that a multi-dimensional editing capability be provided so that two or more color descriptor variables can be simultaneously modified in an editing operation being applied to an image. The known prior art has been limited to image editing with variation of a single color descriptor variable.

The following prior patents have been identified as having limited relevance to the present invention:

1. U.S. Pat. No. 4,190,834, "Circuit and Method for Producing A Full-Screen Cross-Hair Cursor On A Raster-Scan Type Display", dated Feb. 26, 1980, filed by Douglas J. Doornink.

2. U.S. Pat. No. 4,200,867, "System and Method for Painting Images by Synthetic Color Signal Generation and Control", dated Apr. 29, 1980, filed by Elmer D. Hill.

3. U.S. Pat. No. 4,245,244, "Device for Delineating Zones In A Video Image Display", dated Jan. 13, 1981, filed by Robert R. Lijewski, et al.

4. U.S. Pat. No. 4,354,184, "Display System for Localizing Regions In A Mixed Text & Picture Display", dated Oct. 12, 1982, filed by Walter Woborschil.

5. U.S. Pat. No. 4,345,313, "Image Processing Method and Apparatus Having A Digital Airbrush for Touch Up", dated Aug. 17, 1982, filed by Keith T. Knox.

6. U.S. Pat. No. 4,467,322, "Digital Shade Control For Color CRT Background and Cursors", dated Aug. 21, 1984, filed by Wayne D. Bell, et al.

7. U.S. Pat. No. 4,495,491, "Method for Highlighting of A Region On A Display Screen", dated Jan. 22, 1985, filed by Wolfgang Postl.

8. U.S. Pat. No. 4,661,810, "Method For Interactive Rotation of Display Graphic Objects", dated Apr. 28, 1987, filed by Carol S. Himelstein, et al.

9. U.S. Pat. No. 4,694,286, "Apparatus and Method for Modifying Displayed Color Images", dated Sep. 15, 1987, filed by Gar A. Bergstedt.

10. U.S. Pat. No. 4,733,295, "Luminance Selection Apparatus For Video Signal Control System", dated Mar. 22, 1988, filed by Robert I. Hemseky, et al.

11. U.S. Pat. No. 4,751,503, "Image Processing Method With Improved Digital Airbrush Touch Up", dated Jun. 14, 1988, filed by Dorian Kermisch.

12. U.S. Pat. No. 4,751,507, "Method For Simultaneously Displaying An Image And An Enlarged View Of A Selectable Portion Of The Image With Different Levels of Dot Detail Resolution", dated Jun. 14, 1988, filed by Hiroshi Hama, et al.

13. U.S. Pat. No. 4,772,882, "Cursor Controller User Interface System", dated Sep. 20, 1988, filed by Robert J. Mical.

14. U.S. Pat. No. 4,896,291, "Valuator Menu For use As A Graphical User Interface Tool", dated Jan. 23, 1990, filed by Stephen B. Gest, et al.

15. U.S. Pat. No. 4,989,079, "Color Correction Device and Method Having A Hue Area Judgement Unit", dated Jan. 29, 1991, filed by Takanori Ito.

SUMMARY OF THE INVENTION

The present invention has been made in view of the above circumstances and has as an object providing an image editor for an image processing system without the problems and disadvantages described hereinabove.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, there is provided an image editor for an image processing system. The editor comprises means for storing color pixel data for an image to be edited, means for displaying the stored image on a monitor screen, and means for generating an active area on the monitor screen. The active area includes a graphic having represented therein at least two color descriptor variables. The editor also includes means for variably designating positions on the graphic to generate corresponding modified values of the color descriptor variables and means for modifying the image in accordance with a preselected edit operation and in accordance with the modified values of any one of the color descriptor variables or of the two color descriptor variables simultaneously.

Also in accordance with the present invention, there is provided a method for operating an image editor. The method comprises seps of storing color pixel data for an image to be edited, displaying the stored image on a monitor screen, and generating an active area on the monitor screen with at least two color descriptor variables represented therein. The method also comprises steps of variably designating positions on the graphic to generate modified values of the color descriptor variables and modifying the image in accordance with a preselected edit operation and in accordance with modified values of any one of the color descriptor variables or of the two color descriptor variables simultaneously.

BRIEF DESCRIPTION OF THE DRAWINGS

The accompanying drawings, which are incorporated in and constitute a part of this specification, illustrate one embodiment of the invention and together with the description provide an explanation of the objects, advantages and principles of the invention. In the drawings.

DESCRIPTION OF THE PREFERRED EMBODIMENT

Reference will now be made in detail to a preferred embodiment of the invention, an example of which is illustrated in the accompanying drawings.

Figure 1:
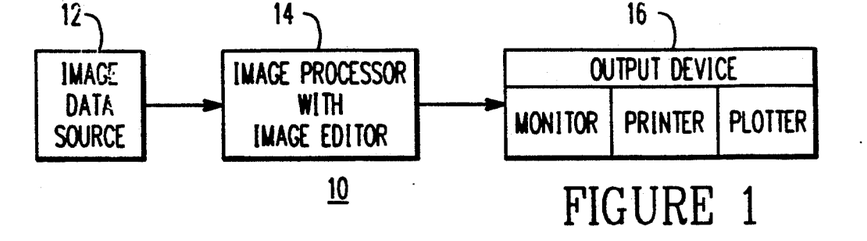
FIG. 1 shows a block diagram for a generalized image processing system in which an image editor arranged in accordance with the present invention is employed.

There is shown in FIG. 1 a general image processing system 10 which is representative of the various kinds of systems in which the present invention can be embodied. Image processing systems may be used for various purposes including the generation of images in the computerized process of creating newspapers, magazines, catalogs, brochures or other documents. High image quality is normally required to meet advertising artwork and other graphic needs in these processes.

The system 10 includes an image data source 12 that provides image data for an image processor 14 having an image editor. Processed image data is applied to an output device 16 such as a monitor, a laser or other printer, or a duplicating machine platen.

The image data may be organized for high quality, high density color displays. For example, in the preferred embodiment, the combined basic colors, i.e., red, green and blue, of each image element or pixel are stored as a total of twenty-four bit values. Each basic color can have $2^8$ or 256 values from 0 to 255. Accordingly, the total number of possible colors for each pixel in a color image is $256^3$ or greater than 16 million. In the preferred embodiment of the invention, effective, fast, quality image editing is achieved with computer capacity economy by encoding stored image data to a reduced color set, in this case a set of 100 preselected colors.

Figure 2:
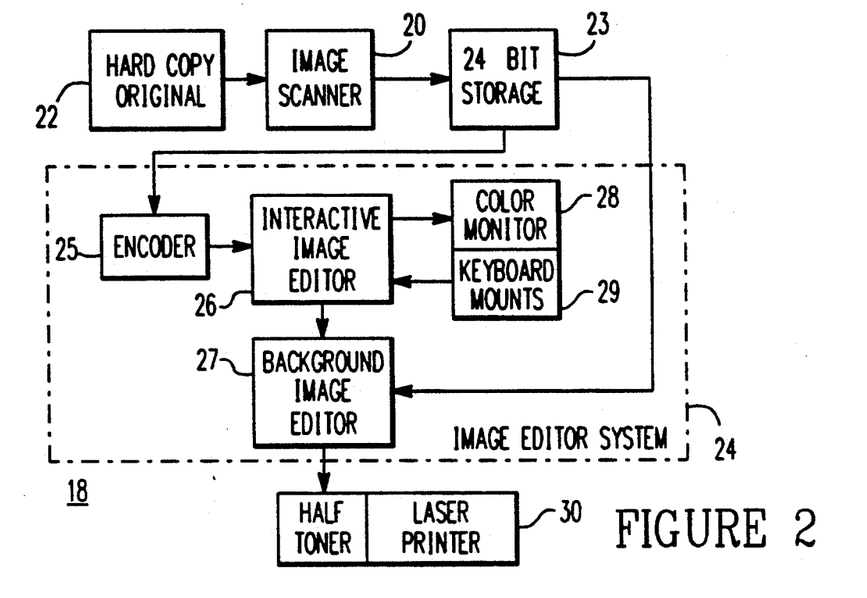
FIG. 2 shows a block diagram for a reprographic system which is a particular form of the image processing system of FIG. 1.

In FIG. 2, there is shown a specific kind of image processing system, namely a reprographic system 18, in which the present invention can be embodied. The reprographic system 18 may be a duplicating system which has an image editing capability.

An image scanner 20 detects image data from a hard copy original 22. The image data is placed in 24-bit storage 23 and then processed through an image editor system 24. An encoder 25 produces image data based on a reduced color set, and the reduced image data is applied to an interactive image editor 26.

The image edit system 26 processes the stored image to produce a modified image resulting from editing operations including operations performed in accordance with the present invention. A color monitor 28 and a keyboard 29 are interactively operated with the image editor 26 in the editing process. Inputs are applied from the 24-bit storage 23 and the interactive image editor 26 to a background image editor 27. The edited image is applied from the background image editor 27 to an output device, in this case a laser printer 30 that will produce a requested number of copies.

Figure 3:
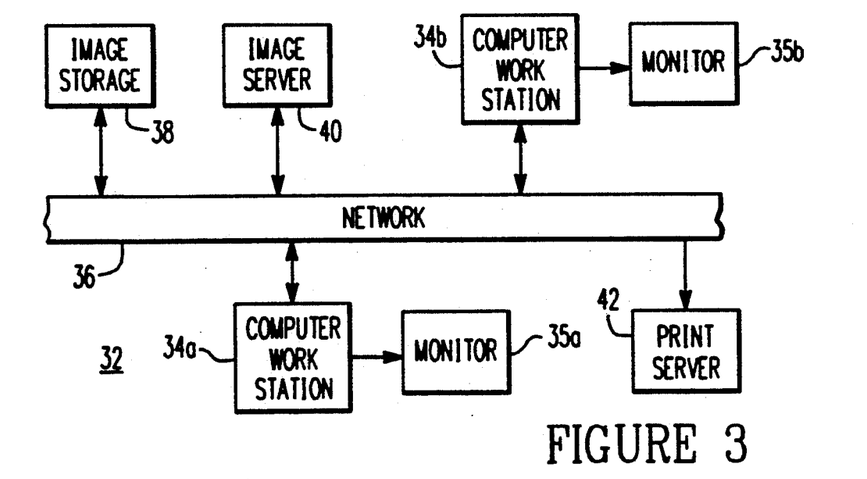
FIG. 3 shows another block diagram for a network based image processing system in which the preferred invention embodiment described herein is employed.

In FIG. 3, another kind of image processing system in which the present invention can be embodied is shown, namely a networked system 32 having a plurality of image editing computer work stations 34a and 34b with associated color monitors 35a and 35b. A network 36 for the system 32 additionally has coupled to it an image storage apparatus 38, an image server 40 and a print server 42, and, if desired, various other subsystems. On request, the image server 40 provides various more complex image processing services to the work stations. The networked system 32 is the type of system in which the preferred embodiment of the invention is implemented.

IMAGE EDITING WORK STATION

Figure 4:
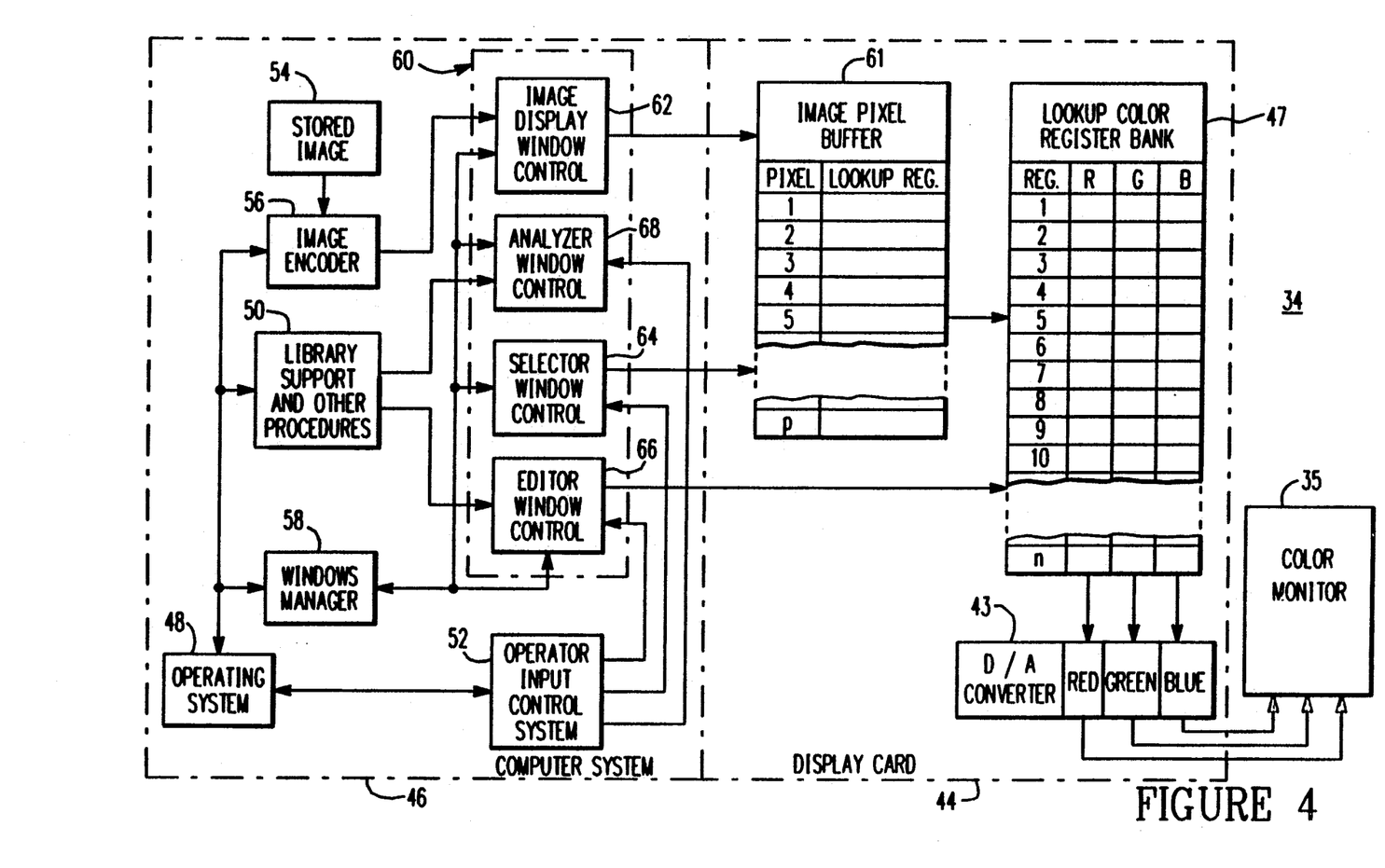
FIG. 4 illustrates a more detailed block diagram for a computer work station arranged in accordance with the principles of the present invention and employed in the network based system of FIG. 3.

An image editing work station 34, corresponding to the work station 34a or 34b is FIG. 3, is shown in greater block diagram detail in FIG. 4. A color monitor 35 provides a display in accordance with red, green, and blue color signals generated by drive circuit means. In the preferred embodiment, the drive circuit means preferably comprises a digital-to-analog converter 43 on a display card 44.

As indicated in FIG. 4, a digital color signal for each screen pixel comprises digital red, green and blue signals supplied by lookup color registers 47. Each of the three components of the color signal is an 8-bit signal. Successive screen pixel signals are converted to analog signals by the converter 43 and rastered onto the monitor screen 35 in the conventional manner.

A digital computer system 46, such as a Sparc Station II TM, preferably operates the display card 44 to generate the monitor display. In other applications of the invention, the functional interface between the digital computer system 46 and the display card 44 may be varied from that which exists in the preferred embodiment.

Programmed operation of the computer system 46 occurs under the direction of an operating system 48 such as UNIX TM. Library support and other procedures 50 are included in the computer program system as needed for the image processing application and for system operation.

An operator input control system 52 includes means for entering image editing actions and for otherwise directing the computer system operation. In the preferred embodiment, the operator input control system 52 includes a mouse (not specifically indicated) which provides various kinds of operator editing entries through interaction with the display on the color monitor 35. The preferred operator control also includes a keyboard for operator entry of alphanumeric editing entries. In other applications of the invention, other operator control devices, such as light pens, pressure sensitive pads, etc., can be employed.

Images to be processed by the work station 34 are suitably stored. Each image is formed by a predetermined number of pixels each of which is typically and preferably defined by three 8-bit words respectively for the red, green and blue color components.

When a stored image 54 is called by the operator for edit processing, the image 54 is first processed in the preferred embodiment by an image encoder 56 to encode the image with a reduced set of preselected colors for effective yet economic image editing for reasons previously explained. A conventional image algorithm program, such as Floyd-Steinberg error diffusion, is employed for the image encoder 56.

Image editing is preferably facilitated in the work station 34 by the use of a windowed display on the screen of the color monitor 35. A conventional windows manager control 58, such as Windowing System TM, as developed by MIT, is employed in the computer program system to control the basic windowed structure of the monitor display.

Image editing means is included in the work station 34 to enable the image 54 to be modified in various ways. The image editing means preferably includes the operator input control system 52, various computer editor controls 60, and an image storage means preferably including a lookup color register bank 47 and an image pixel buffer 61 on the display card 44.

As previously indicated, prior art techniques for editing images have typically employed procedures having limited productivity. The present invention provides significantly enhanced productivity through the image editing means which is characterized by improved structure and operation.

The encoded image provided by the image encoder 56 is handled by an image display window control 62 for color monitor screen display in an image window (not specifically shown). The size and location and screen pixel assignments of the image window are determined by the windows manager 58. The color content of each image pixel in the image window is defined by an image pixel buffer 61 in combination with the lookup color register bank 47.

The lookup color register bank 47 contains n registers including a group of registers that respectively define the R, G, and B values of the respective colors in the set of colors preselected for system use. The color lookup register assigned to a particular image pixel generates the output color signals that produce the screen pixel corresponding to the image pixel.

The image display window control 62 loads the encoded image into the image buffer 61. In the preferred embodiment, the encoded image includes an index value for each image pixel pointing to a color lookup register that contains the R, G, and B values corresponding to the color for that pixel. As indicated in FIG. 4, the image pixel buffer 61 stores the number of the lookup register specified for each image pixel. Image pixels are thus processed for screen display by reference to the designated lookup registers in the pixel buffer 61.

The editor controls 60 also include a pixel selector window control 64 that is operated through a selection menu window 59 (FIG. 5B) and provides the operator with options for limiting or providing boundaries on the extent to which the image stored in the buffer 61 is to be subjected to color and other edit actions. In the preferred embodiment, the optional selectors include:
a. Brush.
b. Freehand.
c. Rectangle.
d. Polygon.
e. Color key.
f. Automatic object selector.

Once a pixel selector is chosen by the operator, color editing of the image is limited to pixels defined by the chosen selector.

Figure 5A:
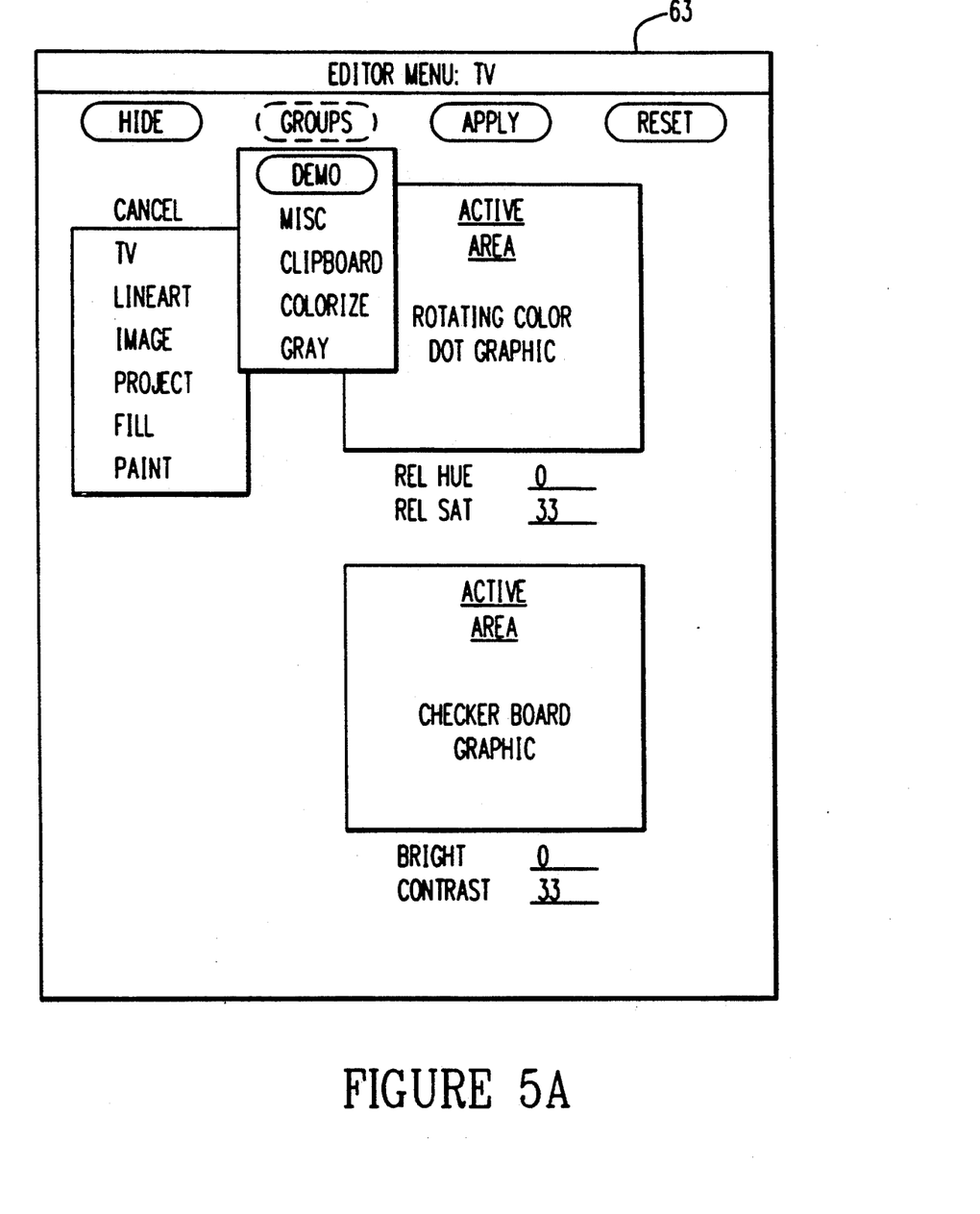
FIGS. 5A and 5B show editing controls and selector menus employed on a screen of a work station monitor in accordance with the present invention.
Figure 5B:
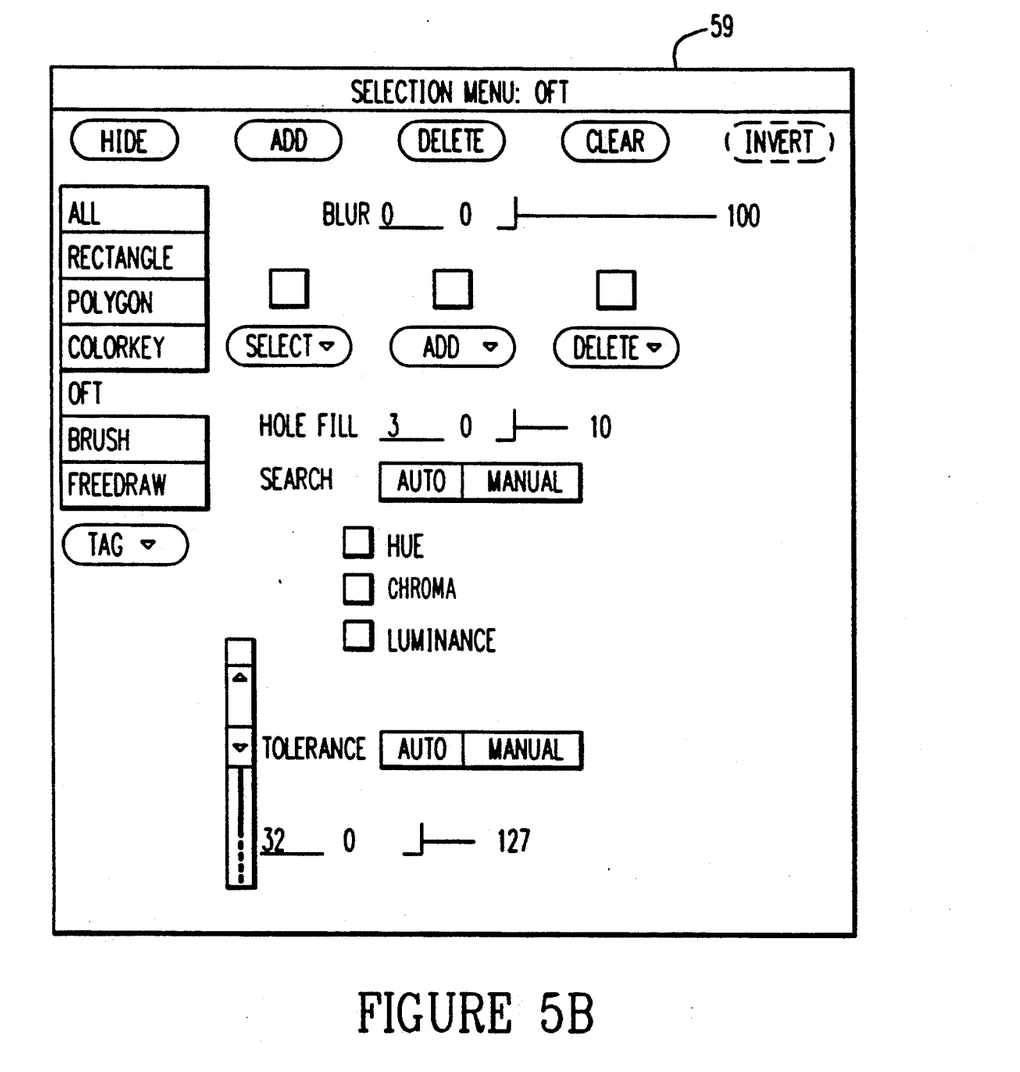

An editor window control 66 implements various editorial operations selected by the operator from an editor menu window 63 (FIG. 5A). In the preferred embodiment, editorial operations or user procedures that can be selected include:
a. TV color.
b. Line art.
c. Image color.
d. Hi-light.
e. Rotate.
f. Crop.
g. Scale.
h. Filter.

In many of the user procedures, operator selections in an active box in the editor menu window are implemented in real time on the image in the image window. In other cases, operator selections are displayed in a separate box in the editor menu window and then implemented on the image in the image window upon operator command.

In the various edit operations, color modifications are implemented through the color lookup bank 47 as indicated in FIG. 4. Thus, any single original color selected for change to a selected new color, in accordance with a particular edit operation, is changed to the new color by modifying the R, G, B values in the lookup register for the original color and storing the modified values in a work lookup register bank.

When the image is thereafter displayed in the image window, any screen pixels in the image, or within selected limits of the image, that have the specified single original color are automatically assigned the modified color in the work register. Multiple color modifications in a single edit operation are simultaneously implemented in the manner described for the single color modification.

An analyzer window control 68 enables the operator to employ the computer to provide image analysis. For example, the operator may request: get pixel color or provide histogram.

Once an edited image becomes acceptable to the operator, it is saved by actuating a save selector and implementing appropriate save procedures. The system can then be cleared to its initialized state and a new image may be called from storage for editing.

MULTI-DIMENSIONAL EDITING CONTROLS

In accordance with the present invention, editing control means operates with multi-dimensional editing capability within an image processing system to provide better image editing with increased editing productivity and facility. In the preferred embodiment, the multi-dimensional editing control means is provided in an editor subsystem including the editing window control 66 in FIG. 4.

As previously indicated, the known prior art has been limited to image editing with variation of a single color descriptor variable. Hue, chroma, brightness, and contrast are primary examples of color descriptor variables. Luminance is brightness modified for eye response. Saturation is a color descriptor variable with a higher order since it represents a combination of luminance and chroma. The color descriptor variables are determined by the basic R, G, and B color variables.

With the described limited editing capability in the prior art, editing convenience and editing productivity has been limited because a sequenced trial and error approach has been required to achieve a desired modification in image appearance that requires changes in two or more color descriptor variables. For example, a desired image modification may require changes in hue and saturation, and the conventional procedure for implementing this change is to try a change in hue and then a change in saturation, and then sequentially repeat this procedure until the combined hue and saturation values produce the desired image appearance.

To achieve significant improvement over the prior art, the present invention employs interactive interface control means for specifying multiple color descriptor variables from a single control mechanism. In the preferred embodiment, the control mechanism includes an active area or box in a window on a monitor screen. Movable overlay indicators in the active area are interactively adjusted by an input operator controller such as a mouse to specify the values of the multiple color descriptor variables.

The active area can be filled with a graphic (pixel map) that displays the range of selections for color descriptor variables represented in the graphic. The architecture of the graphic is arranged to enable effective execution of the editing control for the represented color descriptor variables.

Values are specified for the color descriptor variables by moving the overlay indicators to the point where such values exist. Overlays can include, for example, crosshairs, a ring/radial line combination, or multiple dots located on the ends of rotating radial lines. The particularly overlays used with a particular graphic are preferably selected to provide meaningful interaction with the underlying graphic and effective operation of the editing control being implemented in the active area.

The image to be edited may be modified in real time as the overlay(s) are moved in the active screen area by the operator. Alternatively, the editing control window can include a separate indicator area or box which indicates color changes as the overlay(s) are moved. Once the desired change is observed in the indicator area, the operator can make a selection and save the modification.

To execute editing changes in the values of color descriptor variables, changes are made in the stored R, G. and B color values in the color lookup register bank 47 (FIG. 4) as required to produce the selected descriptor variable values. Preferably, the color lookup register bank 47 includes a register sub-bank in which the color values for all of colors in the system color set are stored, and another working register sub-bank in which the same color values are stored for updating in accordance with editing changes.

A variety of multi-dimensional image editing controls can be embodied in accordance with the invention. The graphics for these editing controls can have varying architectures, but it is preferred that each graphic architecture be designed to its editing control in the manner described above.

A library can be maintained for developed overlays and graphics to enable a system operator to call up a graphic and overlays for whatever editing control or controls are desired for editing operations. The editing graphics and overlays can be stored in the library 50 of FIG. 4.

Figure 5C:
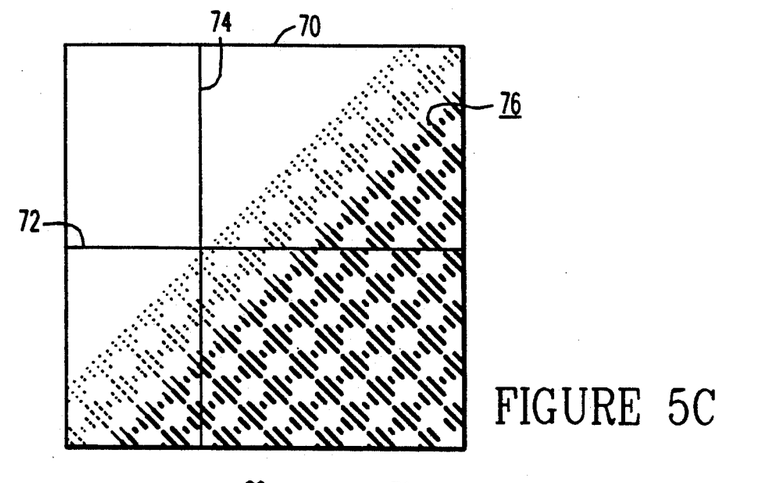
FIGS. 5C–5E show respective active screen areas for respective editing control embodiments of the invention.

In FIG. 5C, there is shown a screen active area 70 for a first embodiment of a multi-dimensional editing control in accordance with the present invention, in this case for brightness and contrast. The active area 70 has a rectangular shape and is provided with perpendicular crosshairs 72 and 74 as overlay indicators. The horizontal crosshair 72 controls image brightness and the vertical crosshair 74 controls the black-and-white contrast of an image.

A mouse (not specifically shown) is employed in the operator input control system 52 (FIG. 4) in the preferred embodiment. If the mouse is clicked on either the horizontal crosshair 72 or the vertical crosshair 74, only the selected crosshair is dragged with the mouse. If the mouse is clicked on both crosshairs 72 and 74, or neither crosshair 72 or 74, both crosshairs 72 and 74 move with the mouse.

The graphic that fills the active area 70 is a checkerboard 76 composed of elements that increase in contrast horizontally and increase in brightness vertically. Both of the descriptor variables, brightness and contrast, are simultaneously modified as the crosshairs 72 and 74 are moved about the graphic 76. The location of the crosshair intersect defines the values for the two descriptor variables, brightness and contrast.

Figure 5D:
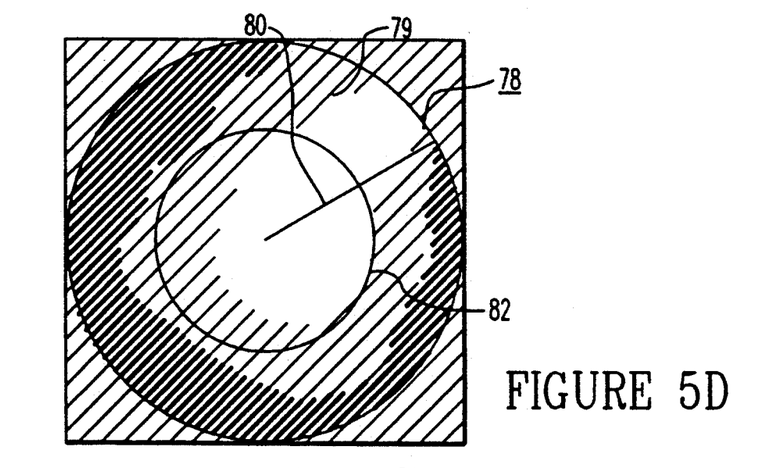

Another embodiment of an editing control in accordance with the invention is shown in FIG. 5D for the color descriptor variables, hue and chroma. In this case, a circular active area 78 contains a graphic 79 in the form of a color wheel with the system colors displayed in a continuum angularly about the circle. Zero chroma exists at the center of the active area 78, and full chroma exists at the outer edge.

An overlay radial line 80 is rotated about the circular active area 78 to select a hue angle. An overlay ring 82 is concentric with an outer circle of the circular active area 78 and is moved radially inward or outward to select a chroma value.

The hue angle (value) is modified by clicking the mouse on the radial line 80 and dragging the line 80 to the desired angle. Chroma is modified by using the mouse to grab the concentric ring 82 and moving the mouse to adjust the radius of the ring 82 to the desired chroma value. In this case, if neither the radial line 80 nor the concentric ring 82 is grabbed by the mouse, both of these overlay indicators are dragged with the mouse to modify hue and chroma simultaneously.

Figure 5E:
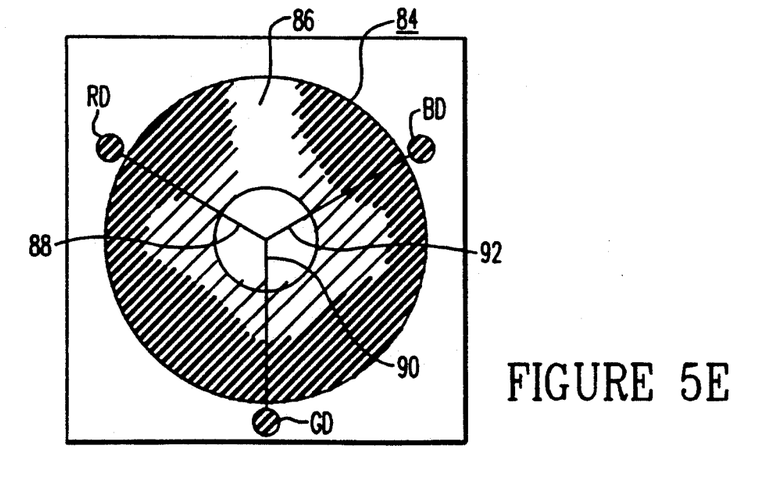

An additional invention embodiment is shown in FIG. 5E. In this case, a circular active area 84 is again employed with a color wheel graphic 86. Three radial lines 88, 90, and 92 are spaced about the circle at equal angles from each other. Respective red, green, and blue dots RD, GD, and BD are located at the ends of the radial lines 88, 90 and 92 and are rotated with the radial lines 88, 90 and 92 about the outer edge of the circle to specify relative hue.

When the graphic 86 is initialized on the screen, the dots RD, GD, and BD are respectively aligned with red, green, and blue spokes in the color wheel. As the three line/dot overlaps are rotated in unison, each dot is aligned with a new modified color. A visual indication is thus given for the color changes made by the rotation of the dots. If both the line/dot overlays and the concentric ring overlay are moved together, both color descriptor variables, namely relative hue and relative chroma, are modified simultaneously.

Figure 6A:
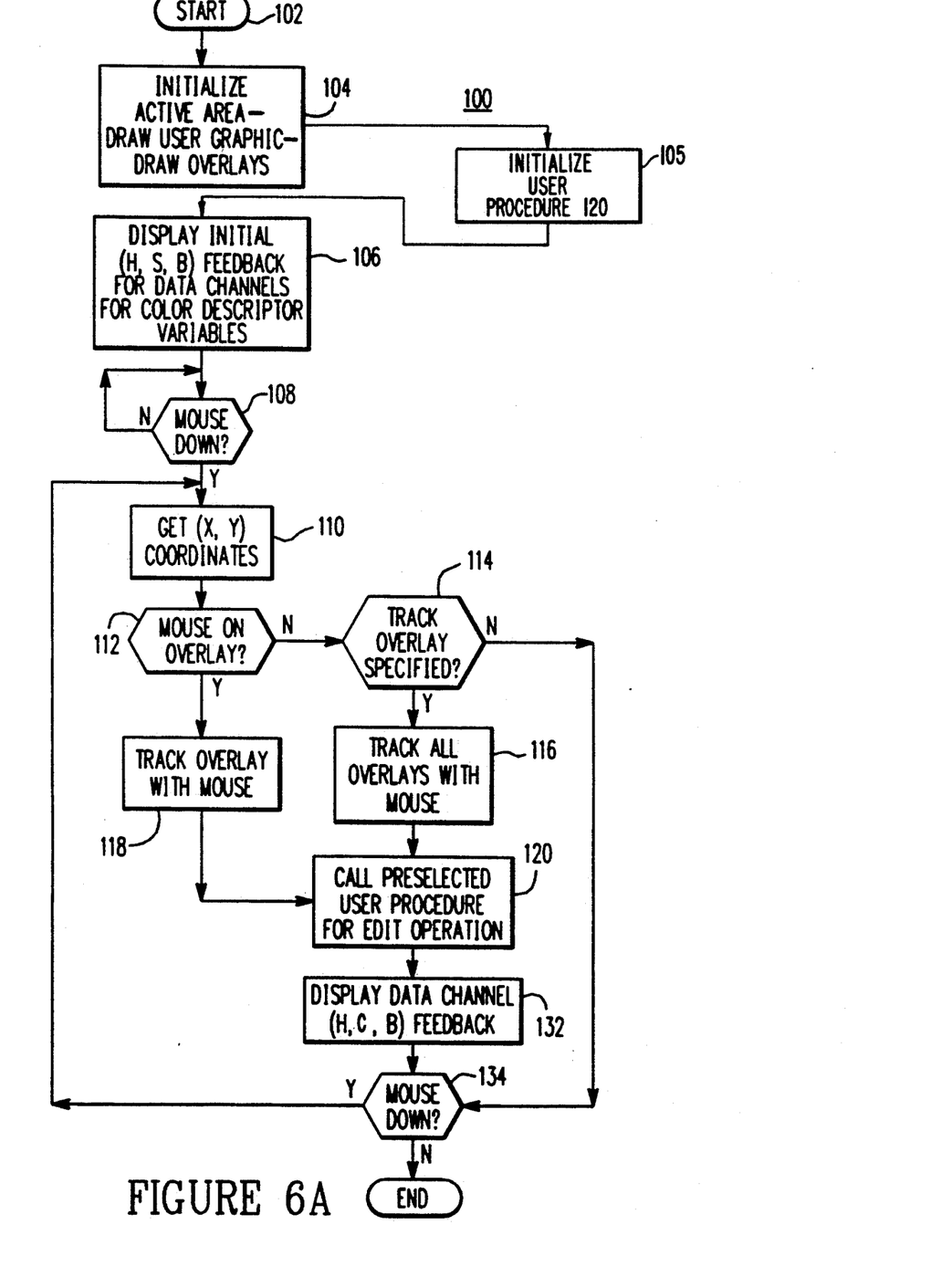
FIGS. 6A and 6B show a flow chart for programming employed to execute editing control in the preferred image editing embodiment of the invention.

FIG. 6A illustrates a flow chart that shows the preferred editing control programming in the form of a procedure 100 that is executed by the computer system 46 (FIG. 4) when a selected editing control is being implemented. The various functions shown in the flow chart are generalized for the various multidimensional editing controls included in the work station 34 (FIG. 4).

Each specific multi-dimensional editing control has individualized elements including a particular active area and graphic and particular overlays and color descriptor variables. The control elements corresponding to the selected editing control are applied during execution of the procedure 100. In the flow chart, the specific color descriptor variables hue H, chroma C, and brightness B are indicated for illustrative purposes.

After the procedure 100 is started in a block 102, the active area for the selected control is initialized at block 104. The applicable graphic is drawn in the active area and the applicable overlays are drawn over the graphic. In the block 105, a preselected user procedure 120 (FIG. 6B) is then called for its initialization.

Next, a block 106 displays the initial feedback data for data channels for the applicable color descriptor variables. Block 108 tests to determine whether the mouse is down. If not, the test keeps repeating.

If the mouse is down, a block 110 gets the X, Y coordinates of the mouse. Block 112 next tests to determine whether the coordinate position indicates that the mouse is on an overlay. If not, test block 114 determines whether a specification exists to track the overlay(s) to a mouse drag. If so, block 116 directs all overlays to be tracked to the mouse.

If the test block 112 indicates that the mouse is on an overlay, block 118 directs that the occupied overlay be tracked with the mouse. With tracking of the overlay(s) determined by block 118 or 116, a block 120 calls a user procedure for a preselected edit operation. The user edit-operation procedure 120 is shown in greater detail in FIG. 6B.

Figure 6B:
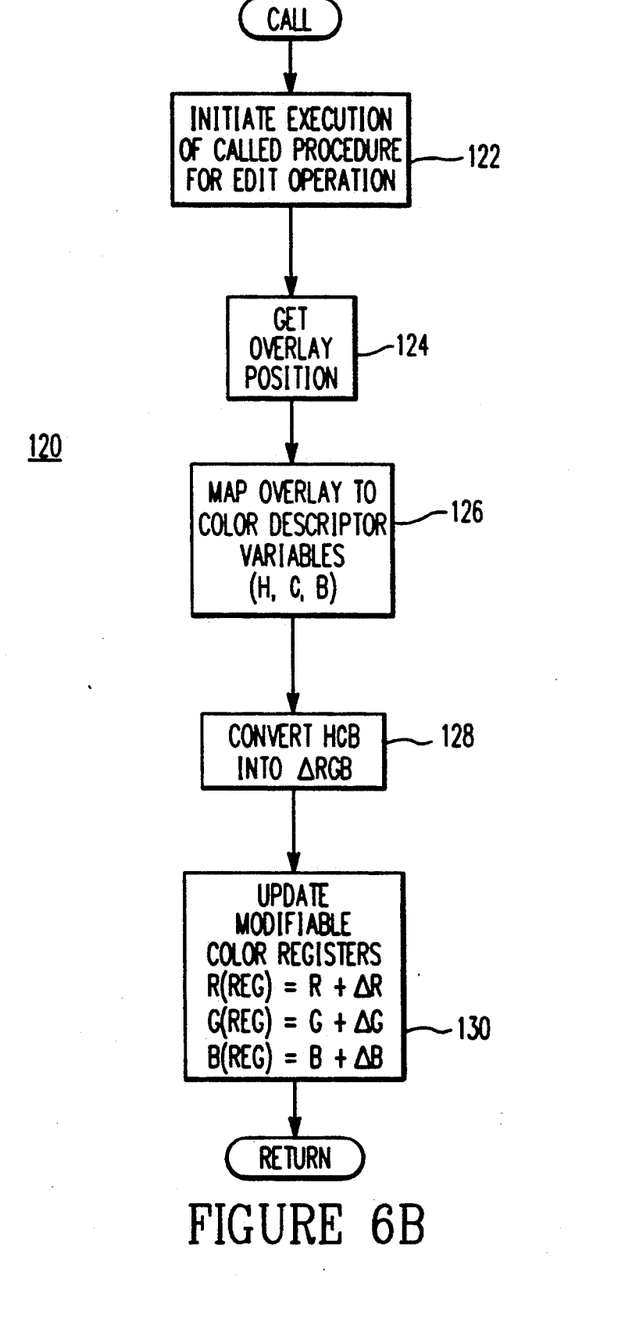

With reference to FIG. 6B, block 122 initiates execution of the called procedure 120. First, block 124 gets the overlay(s) position, and block 126 then maps the overlay(s) to the color descriptor variables applicable to the particular editing control being executed. More particularly, the overlay coordinates are tracked and the block 126 converts the coordinate positions to color descriptor values.

Next, block 128 converts color descriptor variable values to basic color values, i.e., HCB values to RGB values in the present embodiment.

A block 130 then updates color registers that are modifiable in the image buffer 61 in accordance with the edit operation being applied. As illustrated in the block 130, each modified RGB value is the sum of the existing value plus the change or $\Delta$ value.

After updating, a return is made to the main procedure 100 where block 132 displays the data channel feedback. Test block 134 recycles the program execution to the block 110 so long as the mouse is down.

The foregoing description of the preferred embodiment of the invention has been presented for purposes of illustration and description. The description is not intended to be exhaustive or to limit the invention to the precise form disclosed, and modifications and variations of the invention are possible in light of the above disclosure or may be acquired from practice of the invention. It is intended that the description provide an explanation of the principles of the invention and its practical application to enable one skilled in the art to use the invention in various embodiments and with various modifications as are suited to the particular use contemplated. It is intended that the scope of the invention be defined by the claims appended hereto, and their equivalents.

What is claimed is:

1. An image editor for an image processing system, said editor comprising:

means for storing color pixel data for an image to be edited;

means for displaying the stored image on a monitor screen;

means for generating an active area on said monitor screen;

said active area including a graphic having represented therein at least two color descriptor variables;

means for variably designating positions on said graphic to generate corresponding modified values of said color descriptor variables; and means for modifying the image in accordance with a preselected edit operation and in accordance with the modified values of any one of said color descriptor variables or of said at least two color descriptor variables simultaneously.

2. The image editor of claim 1 wherein the color descriptor variables are hue and chroma.

3. The image editor of claim 1 wherein the color descriptor variables are brightness and contrast.

4. The image editor of claim 1 wherein the color descriptor variables are relative hue and relative chroma.

5. The image editor of claim 1 wherein said designating means includes a first hairline overlay movable in one direction to designate values for one of said two variables and a second hairline overlay movable in another direction to designate values for the other of said two variables.

6. The image editor of claim 1 wherein said active area includes a generally circular area and said designating means include a concentric ring overlay movable radially in said circular area to designate values for one of said two variables and a radial line overlay rotatable about said circular area to designate values for the other of said two variables.

7. The image editor of claim 6 wherein said graphic is a color wheel in said circular area, said concentric ring varies chroma from zero to full value as it is moved from its innermost to its outermost radial positions, and said radial line varies hue as it is rotated about said color wheel.

8. The image editor of claim 3 wherein:
said graphic is a substantially square checkerboard of black and white squares;
said designating means includes a first hairline overlay extending horizontally across said checkerboard graphic for minimum-to-maximum control of a selected one of said brightness and contrast variables; and
said designating means includes a second hairline overlay extending vertically on said checkerboard graphic for maximum-to-minimum control of the other of said brightness and contrast variables.

9. The image editor of claim 1 wherein said designating means includes:
a first overlay for controlling one of said two color descriptor variables;
a second overlay for controlling the other one of said two color descriptor variables; and
means for selectably moving said first and second overlays singly to vary either of said color descriptor variables or together to vary said two color descriptor variables simultaneously.

10. The image editor of claim 1 wherein said modifying means modifies said image in real time with color variable changes made by said designating means.

11. The image editor of claim 1 wherein a screen window in which said active area is located includes an indicator area where color variable changes made by said designating means are indicated until the desired change is observed, and said modifying means modifies said image when the change in said indicator area is accepted.

12. A method for operating an image editor, the steps of said method comprising:
storing color pixel data for an image to be edited;
displaying the stored image on a monitor screen;
generating an active area on said monitor screen including a graphic having at least two color descriptor variables represented therein;
variably designating positions on said graphic to generate modified values of said color descriptor variables; and
modifying the image in accordance with a preselected edit operation and in accordance with modified values of any one of said color descriptor variables or of said at least two color descriptor variables simultaneously.

13. The method of claim 12 wherein said designating step includes the steps of:
operating a first overlay to control one of said two color descriptor variables;
operating a second overlay to control the other of said two color descriptor variables; and
moving said overlays singly or together to vary either of said color descriptor variables singly or both of said color descriptor variables together.

* * * * *